(12) United States Patent
Gupta et al.

(10) Patent No.: US 12,051,538 B1
(45) Date of Patent: Jul. 30, 2024

(54) OPEN MIDPLANE, HIGH MAGNETIC FIELD SOLENOID SYSTEM AND METHOD FOR NEUTRON OR X-RAY SCATTERING ANALYSIS

(71) Applicants: Particle Beam Lasers, Inc., Waxahachie, TX (US); Brookhaven Science Associates, LLC, Upton, NY (US)

(72) Inventors: Ramesh Gupta, Shoreham, NY (US); Erich Willen, Westminster, MD (US); Bob Weggel, Reading, MA (US)

(73) Assignees: Particle Beam Lasers, Inc., Waxahachie, TX (US); Brookhaven Science Associates, LLC, Upton, NY (US)

( * ) Notice: Subject to any disclaimer, the term of this patent is extended or adjusted under 35 U.S.C. 154(b) by 436 days.

(21) Appl. No.: 17/479,025

(22) Filed: Sep. 20, 2021

(51) Int. Cl.
  *H01F 6/06* (2006.01)
  *G01N 23/20008* (2018.01)
  *H01F 1/147* (2006.01)
  *H01F 41/04* (2006.01)

(52) U.S. Cl.
  CPC ......... *H01F 6/06* (2013.01); *G01N 23/20008* (2013.01); *H01F 1/147* (2013.01); *H01F 41/048* (2013.01)

(58) Field of Classification Search
  CPC ........................................................ H01F 6/06
  See application file for complete search history.

(56) References Cited

U.S. PATENT DOCUMENTS 9,793,036 B2 * 10/2017 Gupta .................. H01F 6/06
2016/0216348 A1 * 7/2016 Roth ................... H01F 6/06

* cited by examiner

*Primary Examiner* — Paul A Wartalowicz
(74) *Attorney, Agent, or Firm* — Scale LLP

(57) ABSTRACT

A solenoid-magnet system and method for producing high-magnetic-fields, including a substantially radially-open-region located in the axially central region of the solenoid-magnet to allow target placement, particle beam transport and other uses, a substantially axially-open-region located in the radially central region of the solenoid-magnet to allow target placement, particle beam transport and other uses, axially-inward-low-temperature-superconducting-coils and axially-outward-low-temperature-superconducting-coils comprised of low-temperature-superconducting-wire located in radially-outward-regions to generate high magnetic-fields, axially-inward-high-temperature-superconducting-coils and axially-outward-high-temperature-superconducting-coils comprised of high-temperature-superconducting-tape located in radially-inward-regions to generate even higher magnetic-fields, and support-structures to support the coils against large Lorentz-forces.

28 Claims, 14 Drawing Sheets

OPEN MIDPLANE, HIGH MAGNETIC FIELD SOLENOID SYSTEM AND METHOD FOR NEUTRON OR X-RAY SCATTERING ANALYSIS

STATEMENT REGARDING FEDERALLY SPONSORED RESEARCH OR DEVELOPMENT

This invention was made with government support under contract numbers DE-SC0012704 and DE-SC0019722 awarded by the U.S. Department of Energy. The government has certain rights in this invention.

CROSS REFERENCE TO RELATED APPLICATIONS

U.S. Patent Documents

U.S. Pat. No. 5,525,583 June 1996 Dawood Aized and Robert E. Schwall
U.S. Pat. No. 5,914,647 June 1999 Dawood Aized and Robert E. Schwall
U.S. Pat. No. 7,781,376 August 2010 Thomas Kodenkandath, et al
U.S. Pat. No. 7,656,258 February 2010 Timothy A. Antaya, et al
U.S. Pat. No. 8,614,612 December 2013 Timothy A. Antaya and Joel Henry Schultz
U.S. Pat. No. 9,793,036 October 2017 Ramesh Gupta, et al

Other Documents

Nat. Res. Council, "High Magnetic Field Science and Its Application in the United States: Current Status and Future Directions," Washington, DC, Nat. Acad. Press. https://www.nap.edu/read/18355, ISBN 0309387787, 9780309387781 (2013) doi: https://doi.org/10.17226/18355.
Workshop on Probing Matter with X-Rays and Neutrons at the National High Magnetic Field Laboratory, Tallahassee, FL, May 10-12, 2005.
B. Winn, M. B. Stone, et al, Workshop on Neutron Scattering and High Mag. Fields, Sep. 4-5, 2013, https:/neutrons.oml.gov/sites/default/files/Workshop-ReportFINAL FINAL.pdf. ORNL/TM-2014/652, doi: 10.2172/1410956 (2014).
B. Winn, et al, Tech. Report: Ultra-High Field Magnets for X-Ray and Neutron Scattering using High Temperature Superconductors, https://info.ornl.gov/sites/publications/Files/Pub71968.pdf. ORNL/TM-2016/712, DOI: 10.2172/1432171 (2017).
O. Prokhnenko, et al, Time-of-flight Extreme Environment Diffractometer at the Helmholtz-Zentrum Berlin. Rev. Sci. Instr. 86, 033102 (2015); doi: 10.1063/1.4913656.
HFM/EXED. High Magnetic Field Facility for Neutron Scattering.
https://www.helmholtzberlin.
de/pubbin/
igama_output?modus=einzel&gid=1939&sprache=en.
T. Panesor & E. Woodfield, "Neutron scattering," Institute of Physics 2010, https://www.jon.org/publications/jop/2011/file_47455.pdf
R. Gupta, et al, "Open-Midplane Dipole Design for LHC IR Upgrade," MT18, Morioka City, Japan (2003).
R. Gupta, et al, "Optimization of Open Midplane Dipole Design for LHC IR Upgrade," PAC'05, Knoxville, TN, USA (2005).

FIELD OF THE INVENTION

The present invention relates to solenoid magnet devices, more particularly, to a method and system of achieving very high (in the range of 16-40 or 19-40 teslas) magnetic solenoid fields for use in neutron or X-ray scattering analysis.

BACKGROUND

Uses of solenoid magnet devices capable of achieving very high magnetic solenoid fields may include the study of the structure neutron scattering from, and neutron interactions with, elements, isotopes, materials and other specimens under ultra-high magnetic fields. US neutron scattering facilities are currently limited to around 16 T, which is insufficient for these purposes.

High magnetic field is an important tool for tuning the state of matter, creating new states and quantum phases, and changing the fundamental properties of materials. Magnetic fields can modify transport properties of conductors, correlations in magnetic insulators, and the way conduction electrons interact with atomic moments in magnetic metals. Neutron-scattering techniques provide a powerful tool for studying these atomic, molecular and microscopic properties and correlations in condensed matter systems.

Neutron-scattering techniques may use a neutron scattering spectrometer, wherein neutrons collide with a target and the collision products emerge in all directions. The target is located at the center of the spectrometer, and the scattered products of the collisions are observed in a pie-shaped volume forward of the target. Detectors are positioned in the horizontal plane extending a few degrees above and below the midplane. A magnetic field that deflects the scattered particles allows analysis of the energies of those particles. The magnetic field may be provided by a solenoid magnet with an axially-central wedge-shaped gap to supply the pie-shaped volume. Maintaining the needed gap is difficult, because the magnet halves attract each other with a large force.

The importance of developing high magnetic field environments for material studies has been widely appreciated, e.g., in the National Research Council of the National Academy of Sciences report, "High Magnetic Field Science and Its Application in the United States: Status and Future Directions". Workshops by the ORNL Neutron Science Directorate (Workshop on Probing Matter with X-Rays and Neutrons at the National High Magnetic Field Laboratory, Tallahassee, FL, May 10-12, 2005; B. Winn, M. B. Stone, et al, Workshop on Neutron Scattering and High Mag. Fields, Sep. 4-5, 2013) discussed advances in high magnetic field science and practical routes for building high-field magnets for neutron scattering to enable the new science that neutron-scattering measurements in high magnetic fields can provide. A workshop (B. Winn, et al. Tech. Report: Ultra-High Field Magnets for X-Ray and Neutron Scattering using High Temperature Superconductors) focused on the new opportunities provided by the progress in the commercial development of high-temperature superconductor (HTS) technology.

Early commercially available HTS materials were bismuth-based ceramic oxides featuring Bi-2223 and are sometimes referred to as first-generation HTS. Second-generation HTS materials have been developed using rare earth barium copper oxide ceramics. The rare earth element may be one or more of yttrium, samarium, neodymium or gadolinium. These HTS materials are commercially available in the form of a thin flat tape and are also referred to as multi-layer coated conductors. HTS tape may be used in many applications and devices, for example, superconducting magnetic energy storage (SMES) devices, particle accelerators and medical applications.

Low-temperature superconductor (LTS) magnets for neutron-scattering measurements can reach only ~17 T. To reach 26 T, the dedicated beam line EXED at the Helmholtz Zentrum, Berlin (HZB) augmented the field from the superconducting outer coils with 11 teslas from a resistive insert consuming 4.4 MW, at a capital cost of $30 M for the resistive magnet, power supply and cooling system, and also involved operating costs orders of magnitude greater than for an all-superconducting system. (O. Prokhnenko, et al, Time-of-flight Extreme Environment Diffractometer at the Helmholtz-Zentrum Berlin. Rev. Sci. Instr. 86, 033102 (2015); HFM/EXED. High Magnetic Field Facility for Neutron Scattering.)

The magnetic field of the HZB device is horizontal, with a viewing angle of only 30°. The geometry severely limits neutron spectroscopic studies, which require rotation of the sample with respect to the detector array and the incident beam in order to explore its reciprocal space. HTS coils should be able to deliver magnetic fields as intense as 25 T or 40 T. A 25 T or up to 40 T split-coil, vertical-field magnet could be similar in usability and versatility to the LTS systems that are currently the mainstay of neutron scattering studies. Ideally, the magnet would be experiment-friendly, with large viewing ports (~90° to 180° circumferentially and flaring ±5° to ±15° in breadth) and compact and portable between different neutron spectrometers, rather than requiring a dedicated beam line.

Neutron scattering experiments would benefit from magnets with fields at least 50% more intense than the ~17 T presently available from conventional low-temperature superconductors. A high temperature superconductor such as ReBCO, operating at ~4 K as a high field superconductor, is essential, because low-temperature superconductors fall far short of the needed combination of critical field and critical current density.

In order to achieve higher fields, high-temperature-superconducting materials have proven valuable. Aized and Schwall (U.S. Pat. No. 5,525,583, June 1996 and U.S. Pat. No. 5,914,647, June 1999) teach how control of the geometry of high-temperature-superconducting-tape can lead to an increase in the carrying capacity and center magnetic field produced by a high-temperature-superconducting-coil. Kodenkandath, et al (U.S. Pat. No. 7,781,376, August 2010) teach how to use two layers of high-temperature-superconducting material, each of which is selected for its performance at a particular magnetic field direction and which, together, result in enhanced performance for high-temperature-superconducting-coils. Superconducting coils have enabled higher magnetic fields than what was achievable using earlier magnet technology. Antaya et al (U.S. Pat. No. 7,656,258, February 2010) teach how to obtain magnetic fields of at least 9.9 teslas using low-temperature-superconducting-coils, and Antaya et al (U.S. Pat. No. 8,614,612 December 2013) teach how to obtain magnetic fields in excess of 14 teslas using high-temperature-superconducting-coils. Gupta, et al (U.S. Pat. No. 9,793,036 October 2017) teach how to orient high temperature superconducting tape within a hybrid high-temperature-superconductor and low-temperature-superconductor dipole-magnet-system to achieve high-quality fields of 16-25 teslas or 19-25 teslas. In order to increase available aperture in high field magnets while at the same time increasing the fields in the aperture, the "open-midplane dipole" design taught by Ramesh Gupta (T. Panesor & E. Woodfield, "Neutron scattering," Institute of Physics 2010; R. Gupta, et al, "Open-Midplane Dipole Design for LHC IR Upgrade," MT18, Morioka City, Japan (2003)) and demonstrated by Brookhaven National Laboratory (R. Gupta, et al, "Optimization of Open Midplane Dipole Design for LHC IR Upgrade," PAC'05, Knoxville, TN, USA (2005)) has shown the benefits of proper coil and support structure design. Hence, conventional techniques in magnetic devices include the use of non-superconducting conductors, low temperature superconductors and high temperature superconductors. Conventional techniques also include liquid helium systems to cool the coils, support structures to support the coils against Lorentz forces present in the system, electrical contacts to allow electric current into and out of the coils, and an open region for particle beam transport and other uses. These conventional techniques are presently limited to solenoid fields less than or equal to about 16 teslas.

In conventional designs, a robust structure is used to maintain that separation and to provide the cryo-envelope needed for the superconducting magnet. Unfortunately, that structure limits the free flight and observation of the reaction particles and is a major drawback of the conventional design. The structure also forces a larger separation between the virtual poles of the magnets, thereby lessening the strength of the required high field.

Accordingly, there is a need for an improved method and system for generating magnetic solenoid fields that will overcome the field limit of conventional techniques by providing magnetic fields in the range of 16-40 or 19-40 teslas while providing generous viewing access radially, axially, and circumferentially.

SUMMARY

The present disclosure, which addresses the above desires and provides various advantages, describes a method and system for producing a solenoid-magnet with high solenoid magnetic fields. The system includes a substantially radially-open-region located in the axially central region of the solenoid-magnet to allow target placement, particle beam transport and other uses, an axially-open-region located in the radially central region of the solenoid-magnet to allow target placement, particle beam transport and other uses, axially-inward-low-temperature-superconducting-coils and axially-outward-low-temperature-superconducting-coils comprised of low-temperature-superconducting-wire located in radially-middle-regions to generate high magnetic-fields, axially-inward-high-temperature-superconducting-coils and axially-outward-high-temperature-superconducting-coils comprised of high-temperature-superconducting-tape located in radially-inward-regions to generate even higher magnetic-fields and to reduce erroneous fields, and support-structures to support the coils against large Lorentz-forces. The support structures may be comprised of radially-outward-axially-inward-rings located in radially outward axially inward regions of the solenoid-magnet, radially-outward-axially-middle-rings located in radially outward axially middle regions of the solenoid-magnet, axially-outward-rings located in axially outward regions of the solenoid-magnet, a platen located in an axially-middle-region of the solenoid-magnet, radiallymiddle-rings located in a radially middle portion of the solenoid-magnet and located axially between the platen and the axially-outward-rings of the solenoid-magnet, radially-inward-rings located in a radially inward portion of the solenoid-magnet and located axially between the platen and the axially-outward-rings of the solenoid-magnet, and pie-wedges located in a radially outward axially central region of the solenoid-magnet. The high-temperature-superconducting-tape may be comprised of bismuth-strontium-calcium-copper-oxide or rare-earth-metal, barium-copper-oxide (ReBCO) where the rare-earth-metal may be one or more of yttrium, samarium, neodymium, or gadolinium.

Distinctly, the present methods and system employ axially-outward-high-temperature-superconducting-coils and axially-outward-low-temperature-superconducting-coils to magnetically attract axially-inward-high-temperature-superconducting-coils and axially-inward-low-temperature-superconducting-coils so strongly as to overpower the attractive force from coils on the opposite side of the solenoid-magnet midplane. Therefore no midplane-straddling structure is needed for mechanical support of the axially-inward-high-temperature-superconducting-coils and axially-inward-low-temperature-superconducting-coils. Support of the axially-outward-high-temperature-superconducting-coils and axially-outward-low-temperature-superconducting-coils is at a radius so large as to block little of the circumference of the midplane viewing port.

Distinctly, a large unobstructed gap for the scattered particles is preserved, enormously enhancing the quality of the data produced in neutron spectroscopy devices.

Distinctly, the field is higher than in the conventional design because the coil halves are closer together without a robust mechanical structure taking up space.

Distinctly, the overall force between the upper and lower coils is contained with a robust external structure that does not interfere with the neutron scattering.

Other features and advantages of the present methods and system will become apparent from the following detailed description of the embodiments, taken in conjunction with the accompanying drawings, which illustrate by way of example the principles of the methods and system.

BRIEF DESCRIPTION OF THE DRAWINGS

The invention is explained in more detail below with reference to the accompanying drawings in which.

DETAILED DESCRIPTION

In the following detailed description of the embodiments, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In the present disclosure, a high-magnetic-field solenoid-magnet system and methods are described to achieve high-magnetic-fields in a solenoid-magnet 2 which may be in the range of 16-40 or 19-40 teslas by using a combination of Low Temperature Superconductors (LTS) and High Temperature Superconductors (HTS) or all HTS. Economy may favor LTS in the radially-outward regions, where field values permit its use, other considerations may favor the use of HTS everywhere. Superconducting magnets include a liquid-helium-system or cryocooler to cool superconducting materials to the temperatures needed to support a high current density in the high-magnetic-field, support-structures to support the superconductors against the large Lorentz-forces present in the system, electrical-contacts to bring electric-current into and out of the superconductors, a substantially radially-open-region 4 located in the axially central region of the solenoid-magnet 2 system to allow particle beam transport and other uses, a substantially axially-open-region 6 located in the radially central region of the solenoid-magnet 2 system, and the present system will include these aspects as well.

Superconducting Coils

Figure 1:
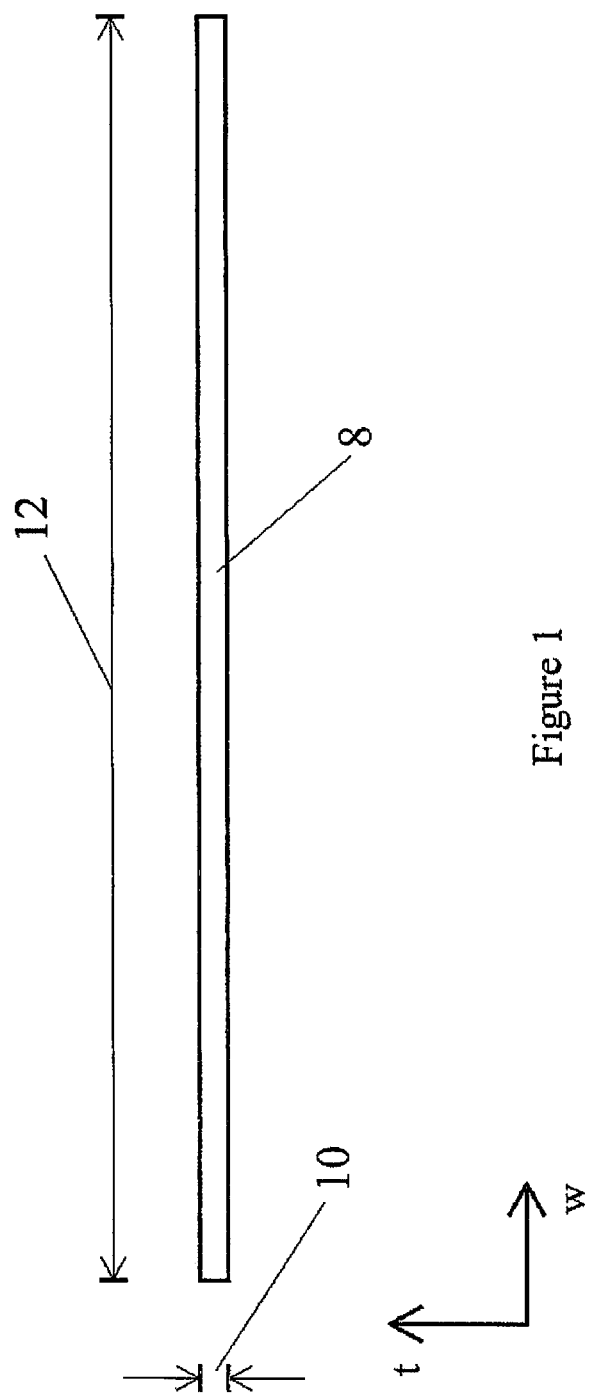
FIG. 1 is a schematic view of a high-temperature-superconducting-tape (HTS-tape) cross-section.
Figure 2:
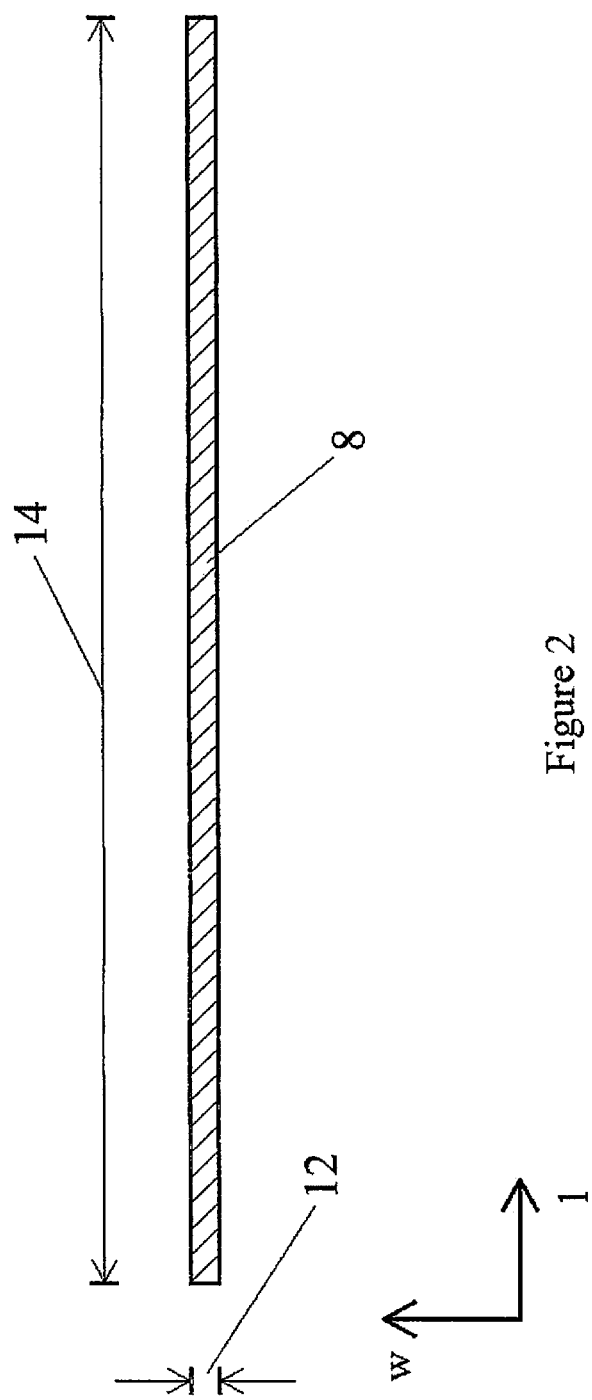
FIG. 2 is a schematic view of HTS-tape.
Figure 3:
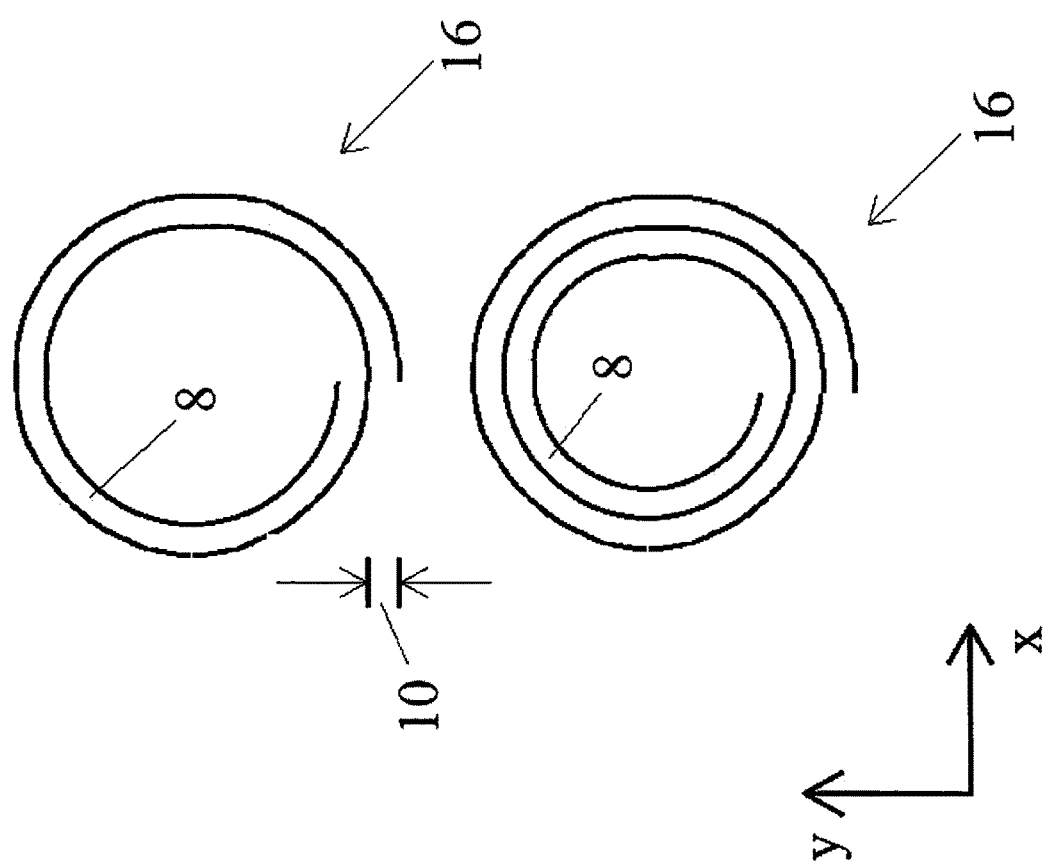
FIG. 3 is a schematic showing a single winding of HTS-tape as well as a schematic showing an HTS-coil.
Figure 4:
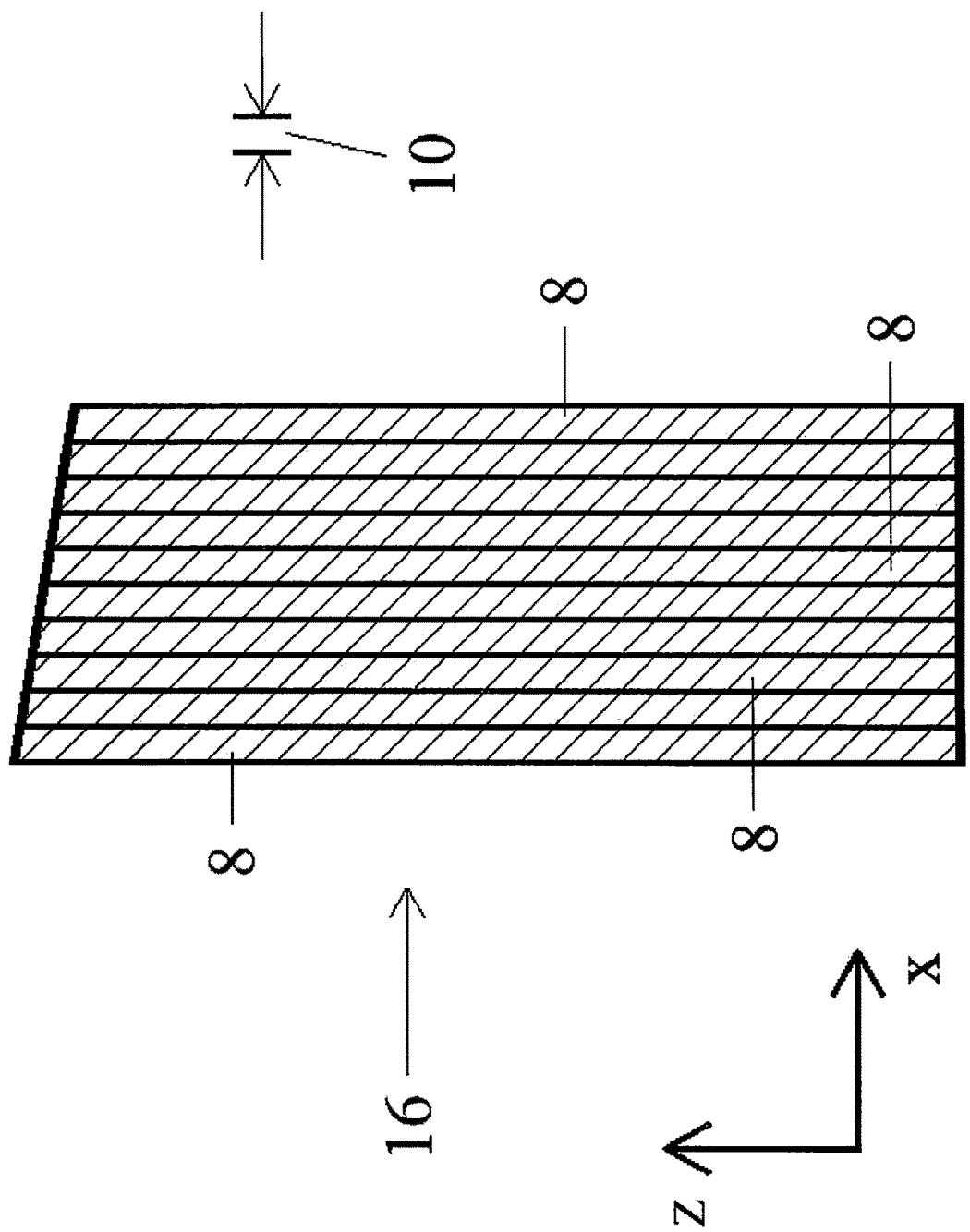
FIG. 4 is a schematic view of an HTS-coil cross-section.

HTS manufacturing techniques produce the HTS material in a tape form. Tapes are geometries that have a very small thickness, a larger width, and an even larger length. FIG. 1 shows a schematic of a high-temperature-superconducting-tape 8 (HTS-tape) having a relatively small HTS-tape-thickness 10 (typically around a hundred microns) and a relatively large-dimension HTS-tape-width 12 (typically 4 mm to 12 mm) forming a rectangular-cross-section. FIG. 2 shows a schematic of an HTS-tape 8 having a relatively small HTS-tape-width 12 (typically 4 mm to 12 mm) and a relatively larger HTS-tape-length 14 (lengths can vary significantly; they are typically longer than a few meters and may exceed 100 meters). The HTS-tape 8 may be comprised of bismuth-strontium-calcium-copper-oxide or rare-earth-metal, barium-copper-oxide (ReBCO) where the rare-earth-metal may be one or more of yttrium, samarium, neodymium, or gadolinium. FIG. 3 shows a schematic of the HTS-tape 8 wound into a high-temperature-superconducting-coil 16. FIG. 3 shows a perspective from the x-y plane. FIG. 4 shows a schematic of a cross-section of the high-temperature-superconducting-coil 16 from the perspective of the x-z plane.

Figure 5:
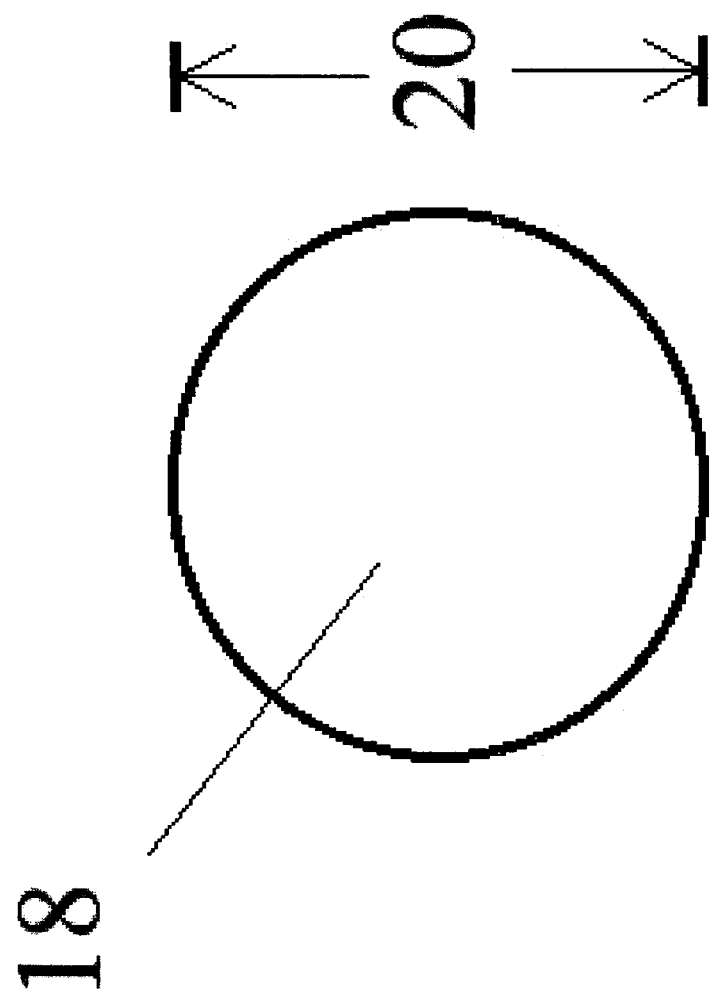
FIG. 5 is a schematic view of an LTS-coil cross-section.
Figure 6:
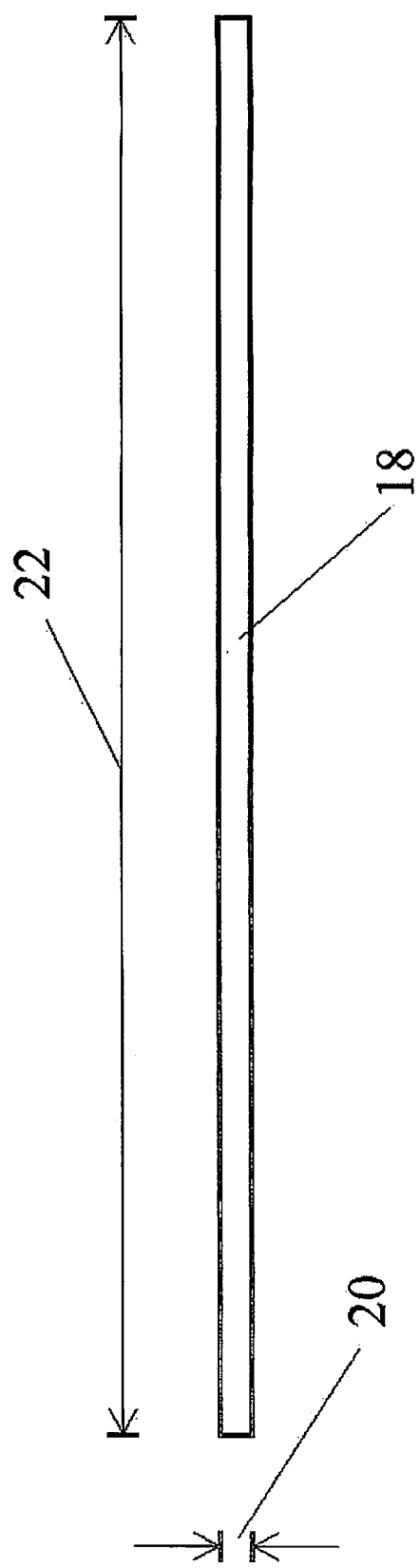
FIG. 6 is a schematic view of LTS-wire.
Figure 7:
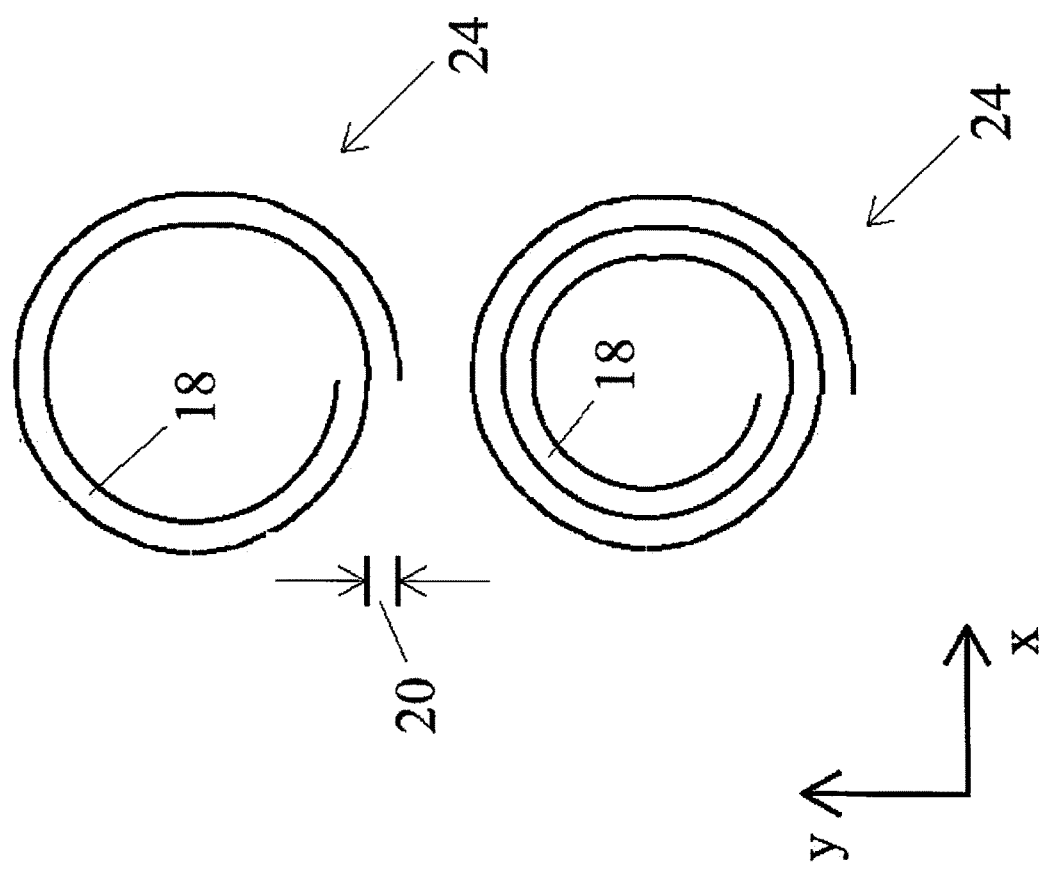
FIG. 7 is a schematic showing a single winding of LTS-wire as well as a schematic showing an LTS-coil.
Figure 8:
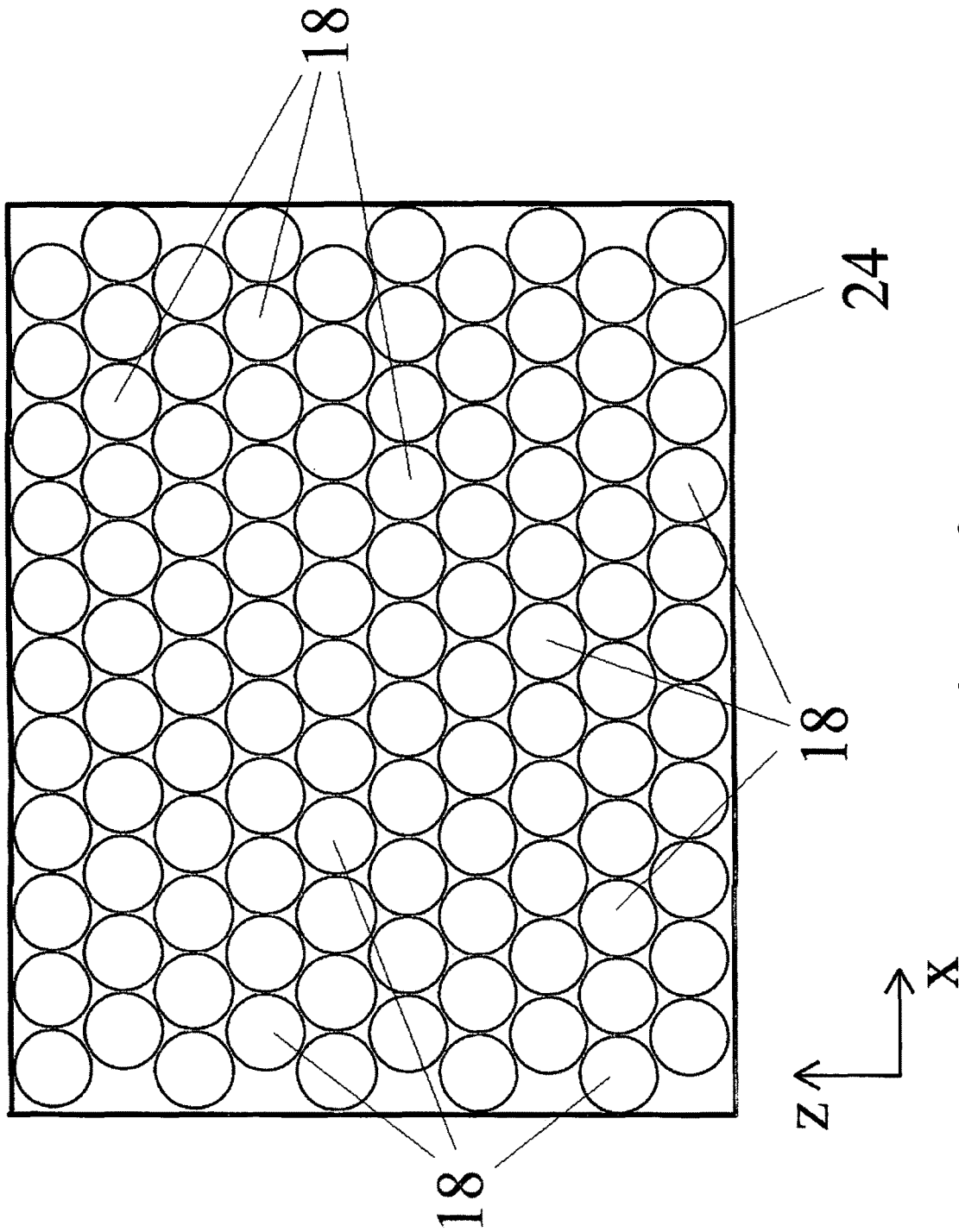
FIG. 8 is a schematic view of an LTS-coil cross-section.

LTS manufacturing techniques produce the LTS material in a wire form. Wires are geometries that have a small, nearly round or nearly square cross-section and a larger length. FIG. 5 shows a schematic of a low-temperature-superconducting-wire 18 (LTS-wire) cross-section with a relatively small LTS-wire-width 20 (typically around a few millimeters). FIG. 6 shows a schematic of an LTS-wire 18 having a relatively small LTS-wire-width 20 and a relatively larger LTS-wire-length 22 (lengths can vary significantly; they are typically longer than a few meters and may exceed a kilometer). The LTS-wire 18 may be comprised of NbTi or $Nb_3Sn$. FIG. 7 shows a schematic of the LTS-wire 18 wound into a low-temperature-superconducting-coil 24. FIG. 7 shows a perspective from the x-y plane. FIG. 8 shows a schematic of a cross-section of the low-temperature-superconducting-coil 24 from the perspective of the x-z plane.

Figure 9:
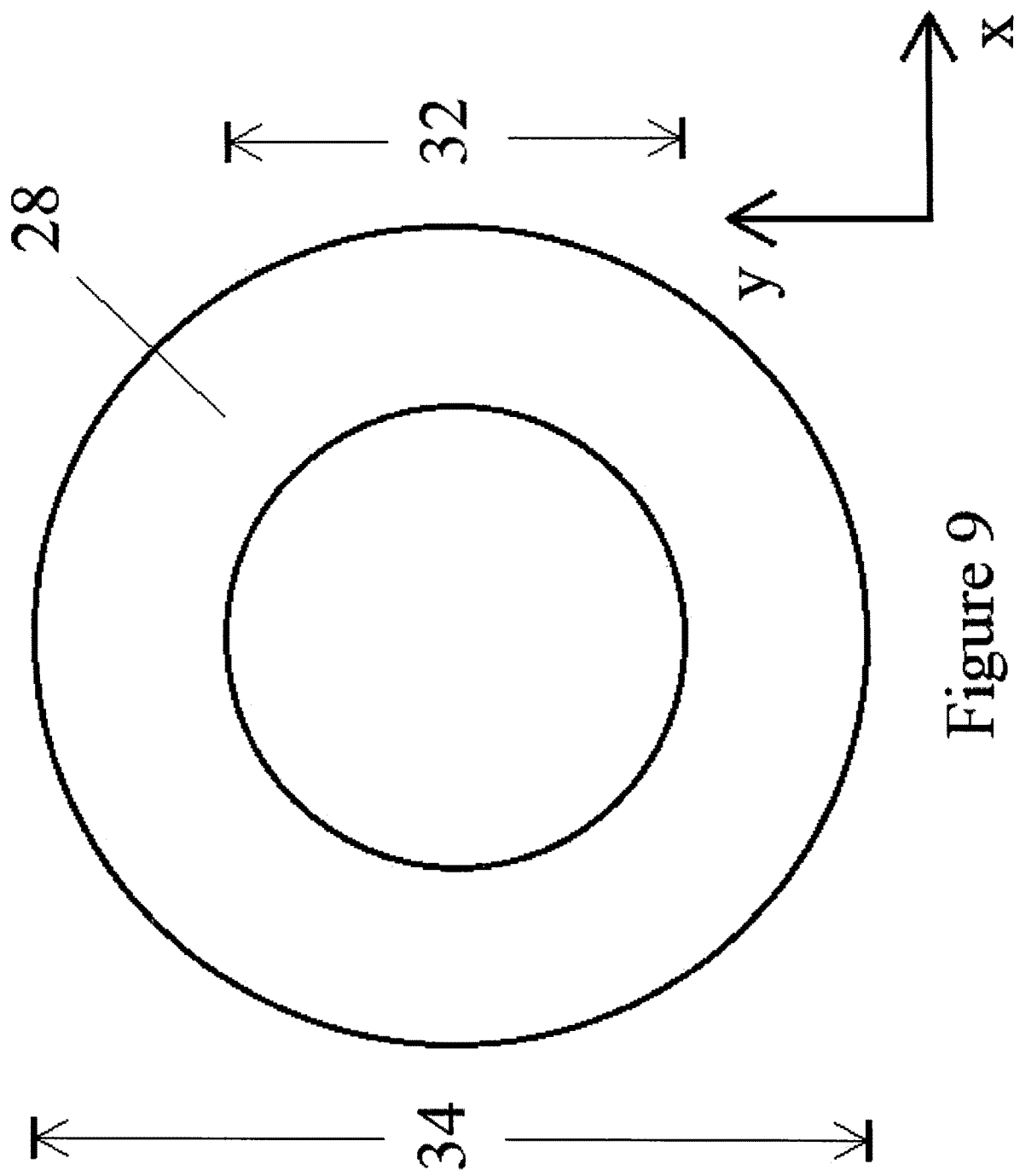
FIG. 9 is a schematic view of a ring support-structure.

The solenoid-magnet 2 may be cylindrically symmetric. FIG. 9 shows a ring geometry in the x-y plane. A top view of a high-temperature-superconducting-coil 16 is a ring 28. A top view of a low-temperature-superconducting-coil 24 is a ring 28.

Coil Support Structures

Figure 10:
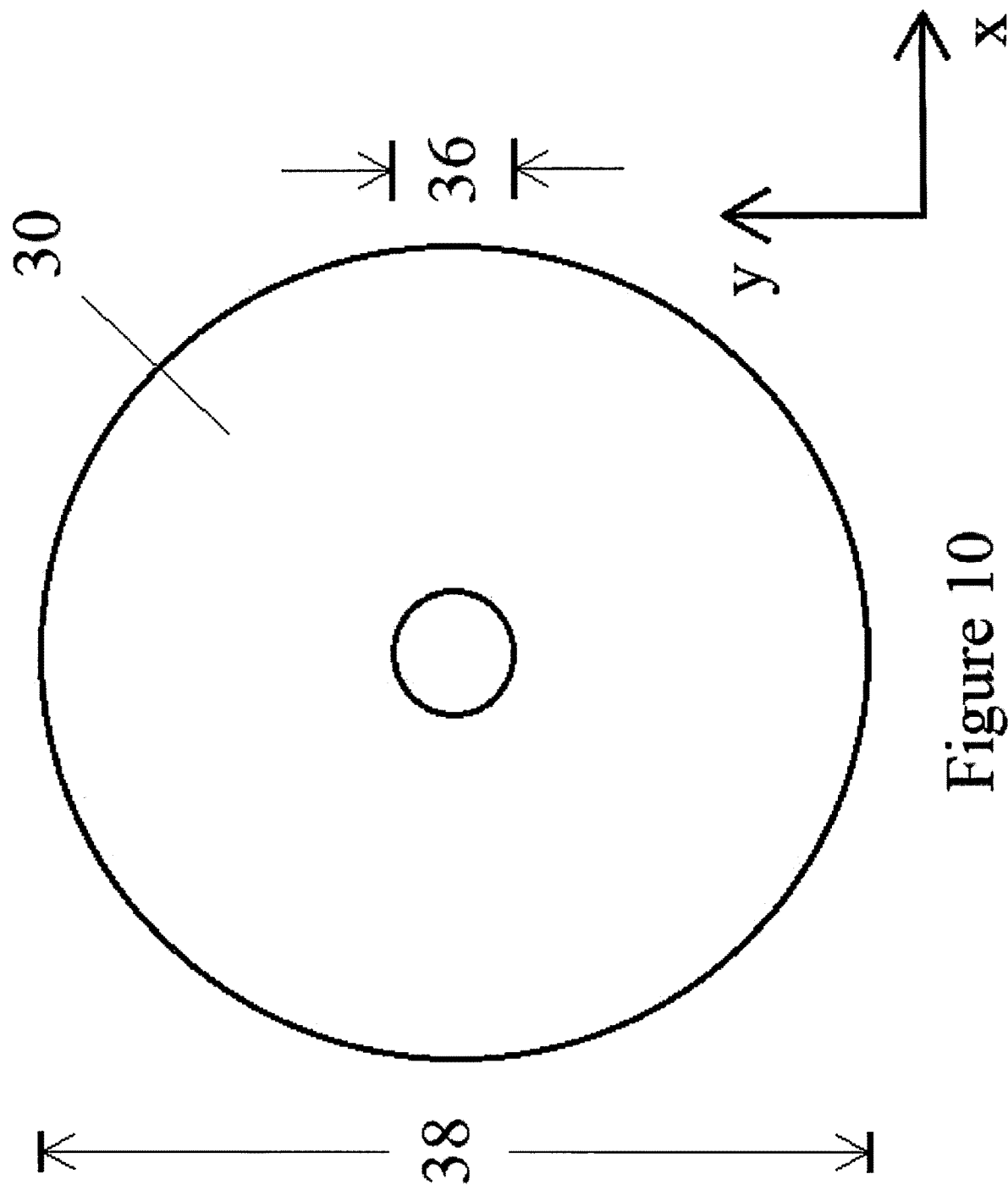
FIG. 10 is a schematic view of a platen support-structure.

High-magnetic-fields in the solenoid-magnet 2 may be in the range of 16- or 19-40 teslas. Such fields will generate very large forces, and a proper support-structure 26 is required to hold the HTS-coils 16 and LTS-coils 24 in their proper location. The support-structure may include of several rings 28 and two platens 30. The ring 28 may be a structure with cylindrical symmetry containing a ring-inner-diameter 32 and a ring-outer-diameter 34. FIG. 9 shows a ring 28 from a perspective of the x-y plane. The platen 30 may be a structure with cylindrical symmetry containing a platen-inner-diameter 36 and a platen-outer-diameter 38. FIG. 10 shows a platen 30 from a perspective of the x-y plane.

Figure 11:
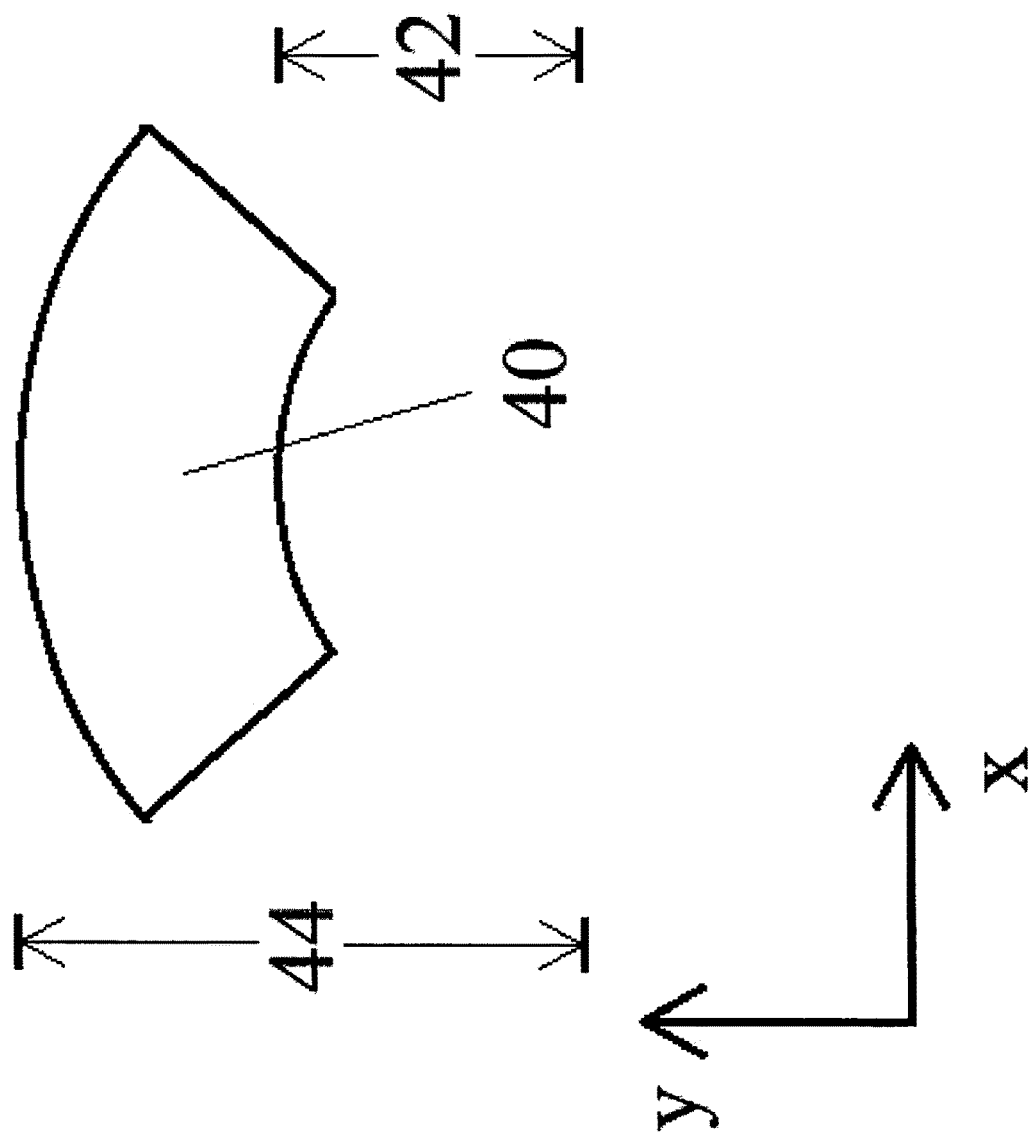
FIG. 11 is a schematic view of a pie-wedge support-structure.

The support-structure 26 may also include pie-wedges 40 to support the large attractive forces between the two halves of the solenoid-magnet 2. The pie-wedges have a pie-wedge-inner-radius 42 and a pie-wedge-outer-radius 44. FIG. 11 shows a pie-wedge 40 from a perspective of the x-y plane.

Superconductor Coil and Support Structure Placement to Achieve Desired Fields

Figure 12:
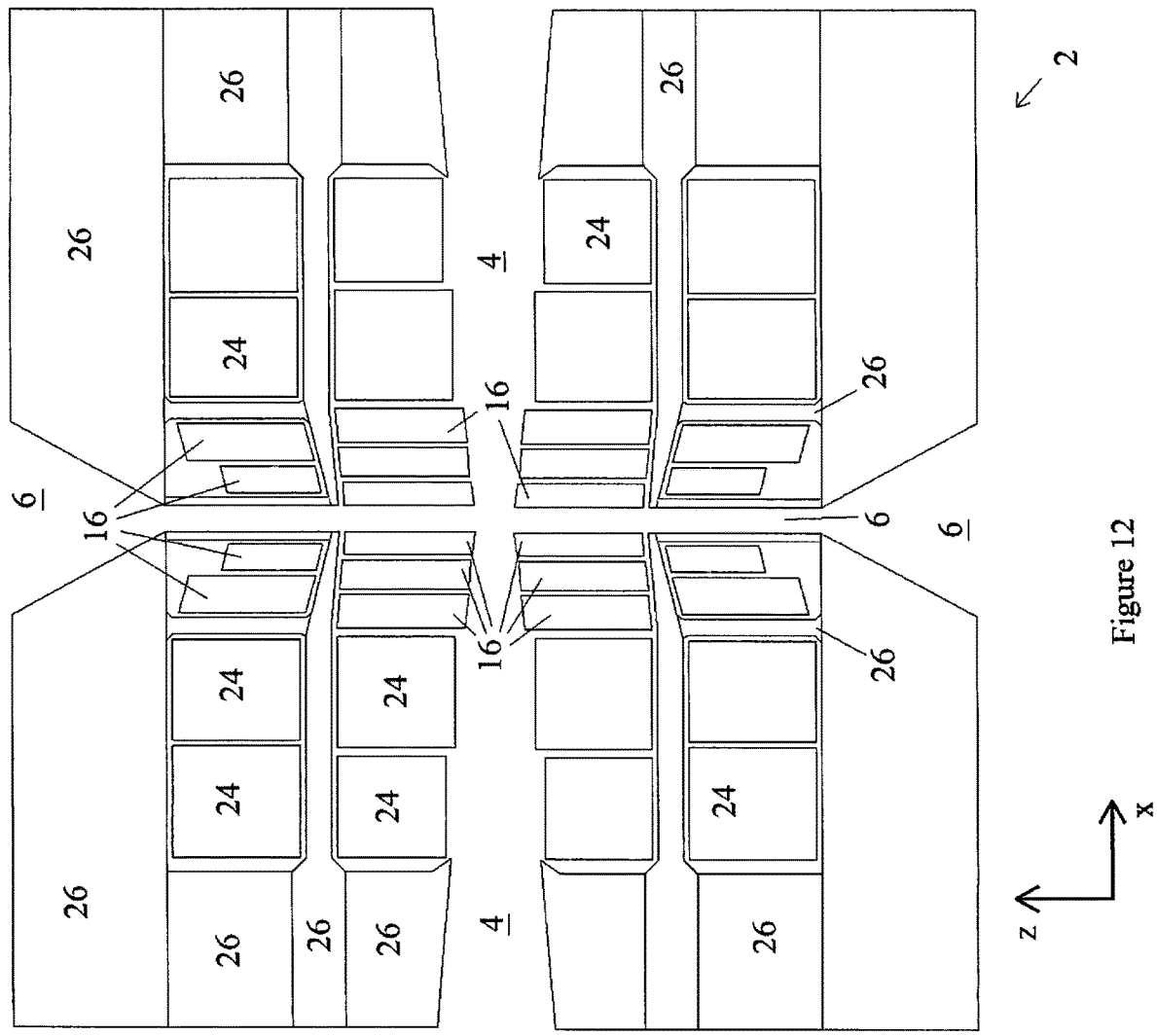
FIG. 12 is a schematic view of a solenoid-magnet cross-section where there is no pie-wedge support-structure.
Figure 13:
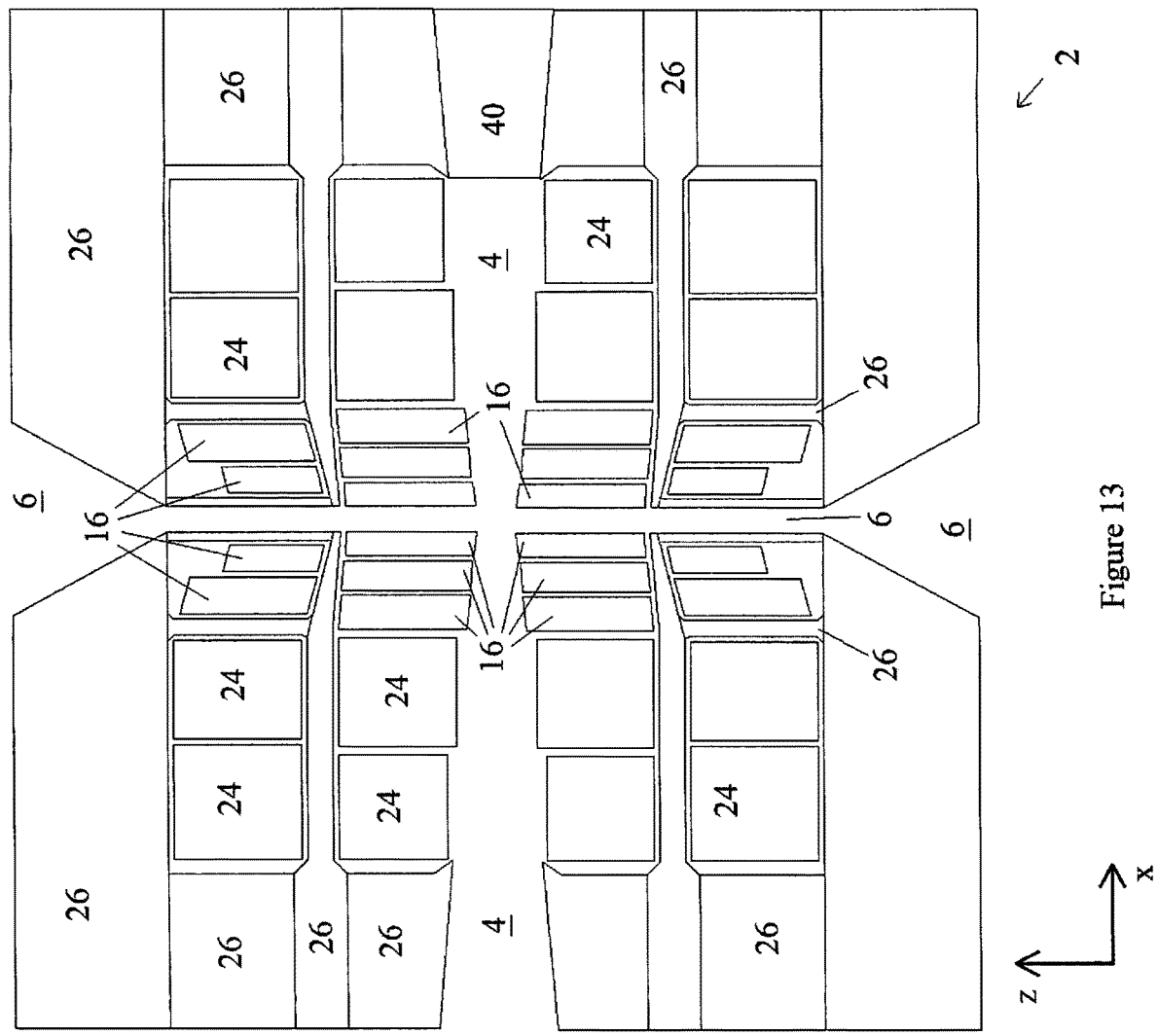
FIG. 13 is a schematic view of a solenoid-magnet cross-section where there is a pie-wedge support-structure.

FIG. 12 shows a solenoid-magnet 2 comprising high-temperature-superconducting-coils 16, low-temperature-superconducting-coils 24 support-structures 26, as well as the radially-open-region 4 and the axially-open-region 6 from a perspective of the x-z plane in the case where there is no pie-wedge 40. FIG. 13 shows a solenoid-magnet 2 comprising high-temperature-superconducting-coils 16, low-temperature-superconducting-coils 24 support-structures 26, as well as the radially-open-region 4 and the axially-open-region 6 from a perspective of the x-z plane in the case where there is a pie-wedge 40.

Figure 14:
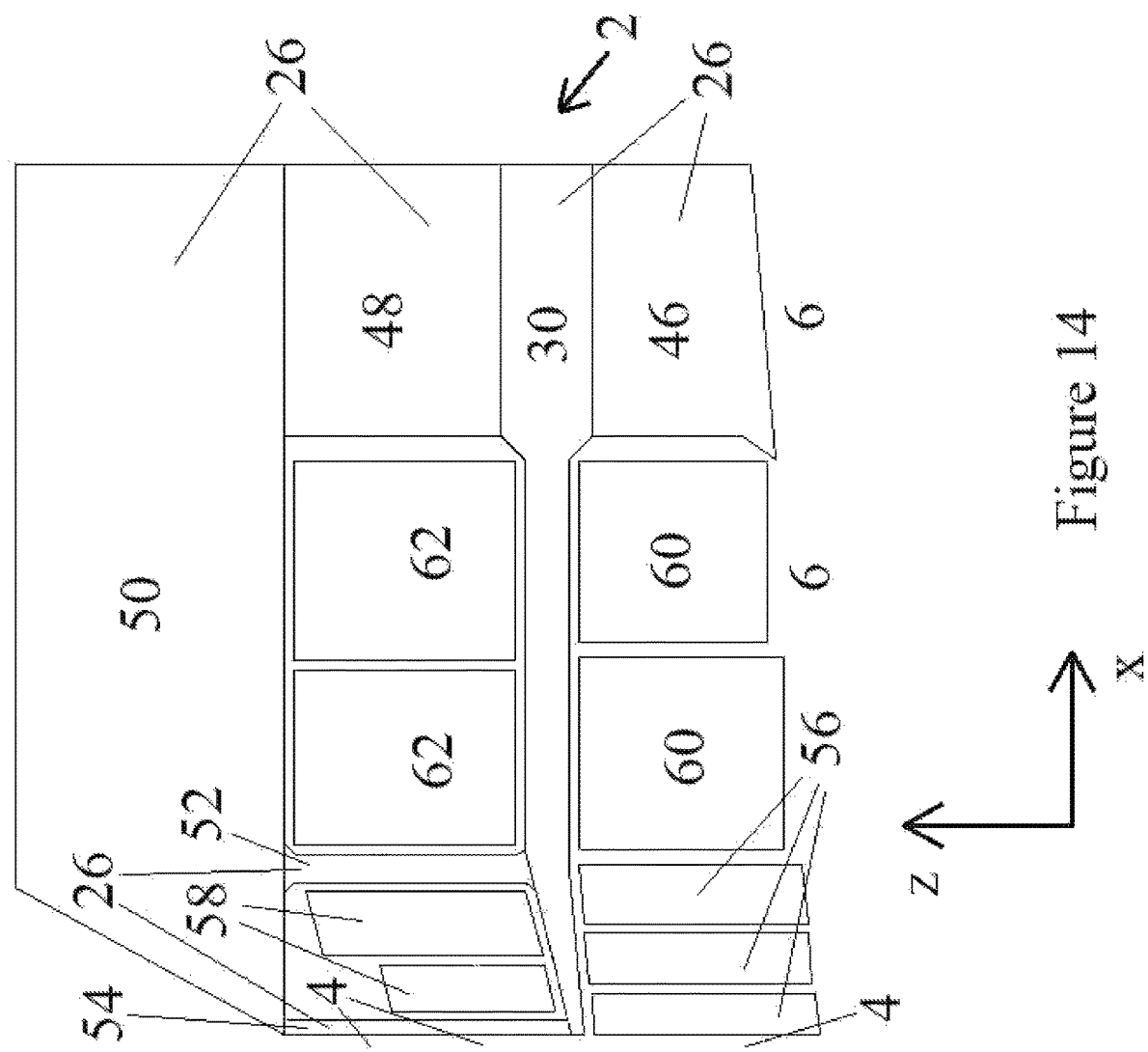
FIG. 14 is a schematic view of a one quadrant of a solenoid-magnet cross section where the various support-structures and coils are enumerated.

FIG. 14 shows one quadrant of the cross-section of the solenoid-magnet 2 from a perspective of the x-z plane. FIG. 14 shows how the support-structure 26 for the solenoid-magnet 2 is comprised of platens 30, radially-outward-axially-inward-rings 46, radially-outward-axially-middle-rings 48, axially-outward-rings 50, radially-middle-rings 52 and radially-inward-rings 54. FIG. 14 also shows the positioning of the axially-inward-high-temperature-superconducting-coils 56, axially-outward-high-temperature-superconducting-coils 58, axially-inward-low-temperature-superconducting-coils 60 and axially-outward-low-temperature-superconducting-coils 62 for the solenoid-magnet 2.

FIG. 14 shows that the radially-outward-axially-inward-rings 46 are axially-located closer to the axially-open-region 6 than are the radially-outward-axially-middle-rings 48, and that the radially-outward-axially-inward-rings 46 are radially-located further from the radially-open-region 4 than are the radially-middle-rings 52.

FIG. 14 shows that the radially-outward-axially-middle-rings 48 are axially-located further from the axially-open-region 6 than are radially-outward-axially-inward-rings 46 and that the radially-outward-axially-middle-rings 48 are axially-located closer to the axially-open-region 6 than are the axially-outward-rings 50, and that radially-outward-axially-middle-rings 48 are radially-located further from the radially-open-region 4 than are the radially-middle-rings 52.

FIG. 14 shows that the axially-outward-rings 50 are axially-located further from the axially-open-region 6 than are the radially-outward-axially-middle-rings 48.

FIG. 14 shows that the radially-middle-rings 52 are radially-located further from the radially-open-region 4 than are the radially-inward-rings 54 and that the radially-middle-rings 52 are radially-located closer to the radially-open-region 4 than are the radially-outward-axially-middle-rings 48.

FIG. 14 shows that the radially-inward-rings 54 are radially-located closer to the radially-open-region 4 than are the radially-middle-rings 52.

FIG. 14 shows that the axially-inward-high-temperature-superconducting-coils 56 are axially-located closer to the axially-open-region 6 than are the axially-outward-high-temperature-superconducting-coils 58.

FIG. 14 shows that the axially-outward-high-temperature-superconducting-coils 58 are axially-located further from the axially-open-region 6 than are the axially-inward-high-temperature-superconducting-coils 56.

FIG. 14 shows that the axially-inward-low-temperature-superconducting-coils 60 are axially-located closer to the axially-open-region 6 than are the axially-outward-low-temperature-superconducting-coils 62.

FIG. 14 shows that the axially-outward-low-temperature-superconducting-coils 62 are axially-located further from the axially-open-region 6 than are the axially-inward-low-temperature-superconducting-coils 60.

FIG. 12, FIG. 13 and FIG. 14 show cross-sectional perspectives of the high-temperature-superconducting-coils 16, low-temperature-superconducting-coils 24 support-structures 26 from the x-z plane. From the perspective of the x-y plane, the radially-outward-axially-inward-rings 46, the radially-outward-axially-middle-rings 48, the axially-outward-rings 50, the radially-middle-rings 52, the radially-inward-rings 54, the axially-inward-high-temperature-superconducting-coils 56, the axially-outward-high-temperature-superconducting-coils 58, the axially-inward-low-temperature-superconducting-coils 60 and axially-outward-low-temperature-superconducting-coils 62 will all have the shape of a ring 28 as shown in FIG. 9 each with a specific ring-inner-diameter 32 and ring-outer-diameter 34 as shown in FIG. 12, FIG. 13 and FIG. 14. From the perspective of the x-y plane, the platen 30 will have the shape as shown in FIG. 10. From the perspective of the x-y plane, the pie-wedge 40 will have the shape as shown in FIG. 11. With substantial cylindrical symmetry, the y-z perspective is substantially the same as the x-z perspective as shown in FIG. 12, FIG. 13 and FIG. 14.

Inner Coil Support Through Magnetic Attraction Instead of Mechanical Support

An embodiment could involve a system and method as shown in the various drawings. The invention involves employing magnetic attraction instead of mechanical support for the axially-inward-high-temperature-superconducting-coils 56 and axially-inward-low-temperature-superconducting-coils 60 of a solenoid-magnet 2 with multiple nested split-solenoids—i.e., solenoids with a midplane gap, as in a Helmholtz pair. The axially-outward-high-temperature-superconducting-coils 58 and axially-outward-low-temperature-superconducting-coils 62 magnetically attract the axially-inward-high-temperature-superconducting-coils 56 and axially-inward-low-temperature-superconducting-coils 60 so strongly as to overpower the attractive force from coils on the opposite side of the magnet midplane. Therefore no midplane-straddling structure is needed for mechanical support. Support for the axially-outward-high-temperature-superconducting-coils 58 and axially-outward-low-temperature-superconducting-coils 62 straddles the midplane, but only through pie wedges 40 confined to circumferential regions that may be at least ±30° from the axis of the viewing port.

The foregoing summary is illustrative only and is not intended to be in any way limiting. In addition to the illustrative aspects, embodiments, and features described above, further aspects, embodiments, and features will become apparent by reference to the drawings and the above detailed description.

It will be understood that any geometric shape, which is expressly or implicitly disclosed in the specification and/or recited in a claim is intended for illustration only and is not intended to be in any way limiting.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A high-magnetic-field solenoid-magnet system comprising:
   a plurality of axially-outward-high-temperature-superconducting-coils comprised of windings of high-temperature-superconducting-tape;
   a plurality of axially-inward-high-temperature-superconducting-coils comprised of windings of high-temperature-superconducting-tape;
   a plurality of axially-outward-low-temperature-superconducting-coils comprised of windings of low-temperature-superconducting-wire;
   a plurality of axially-inward-low-temperature-superconducting-coils comprised of windings of low-temperature-superconducting-wire;
   a plurality of support-structures to support said axially-outward-high-temperature-superconducting-coils, said axially-inward-high-temperature-superconducting-coils, said axially-outward-low-temperature-superconducting-coils, said axially-inward-low-temperature-superconducting-coils;
   a radially-open-region located in the axially central region of said solenoid-magnet system; and
   an axially-open-region located in the radially central region of said solenoid-magnet system.

2. The system in accordance with claim 1, wherein said support-structures include radially-outward-axially-inward-rings located in radially outward axially inward regions of said solenoid-magnet.

3. The system in accordance with claim 1, wherein said support-structures include radially-outward-axially-middle-rings located in radially outward axially middle regions of said solenoid-magnet.

4. The system in accordance with claim 1, wherein said support-structures include axially-outward-rings located in axially outward regions of said solenoid-magnet.

5. The system in accordance with claim 1, wherein said support-structures include a platen located in an axially-middle-region of said solenoid-magnet.

6. The system in accordance with claim 5, wherein said support-structures are radially-middle-rings located in a radially-middle region of said solenoid-magnet and located axially between said platen and said axially-outward-rings of said solenoid-magnet.

7. The system in accordance with claim 5, wherein said support-structures are radially-inward-rings located radially-inward of said solenoid-magnet and located axially between said platen and said axially-outward-rings of said solenoid-magnet.

8. The system in accordance with claim 1, wherein said support-structures are pie-wedges located in radially outward axially middle regions of said solenoid-magnet.

9. The system in accordance with claim 5, wherein said axially-outward-low-temperature-superconducting-coils are located axially between said platen and said axially-outward-rings and located radially in a radially-middle-region of said solenoid-magnet.

10. The system in accordance with claim 5, wherein said axially-inward-low-temperature-superconducting-coils are located axially between said platen and said radially-open-region and located radially in a radially-middle-region of said solenoid-magnet.

11. The system in accordance with claim 5, wherein said axially-outward-high-temperature-superconducting-coils are located axially between said platen and said axially-outward-rings and are located radially between said radially-inward-rings and said radially-middle-rings of said solenoid-magnet.

12. The system in accordance with claim 5, wherein said axially-inward-high-temperature-superconducting-coils are located axially between said platen and said radially-open-region and located radially between said axially-open-region and said axially-inward-low-temperature-superconducting-coils of said solenoid-magnet.

13. The system in accordance with claim 1, wherein said axially-inward-high-temperature-superconducting-coils and said axially-outward-high-temperature-superconducting-coils are comprised of bismuth-strontium-calcium-copper-oxide.

14. The system in accordance with claim 1, wherein said axially-inward-high-temperature-superconducting-coils and said axially-outward-high-temperature-superconducting-coils are comprised of rare-earth-metal, barium-copper-oxide (ReBCO) compounds, wherein said rare-earth-metal is yttrium, samarium, neodymium, or gadolinium or combinations thereof.

15. A method of producing high-magnetic-fields in a solenoid-magnet comprising the steps of:
   operating a plurality of axially-outward-high-temperature-superconducting-coils comprised of windings of high-temperature-superconducting-tape;
   operating a plurality of axially-inward-high-temperature-superconducting-coils comprised of windings of high-temperature-superconducting-tape;

operating a plurality of axially-outward-low-temperature-superconducting-coils comprised of windings of low-temperature-superconducting-wire;

operating a plurality of axially-inward-low-temperature-superconducting-coils comprised of windings of low-temperature-superconducting-wire;

operating a plurality of support-structures to support said axially-outward-high-temperature-superconducting-coils, said axially-inward-high-temperature-superconducting-coils, said axially-outward-low-temperature-superconducting-coils, said axially-inward-low-temperature-superconducting-coils;

operating a radially-open-region located in the axially central region of said solenoid-magnet system; and operating an axially-open-region located in the radially central region of said solenoid-magnet system.

16. The method in accordance with claim 15, wherein said support-structures include radially-outward-axially-inward-rings located in radially outward axially inward regions of said solenoid-magnet.

17. The method in accordance with claim 15, wherein said support-structures include radially-outward-axially-middle-rings located in radially outward axially middle regions of said solenoid-magnet.

18. The method in accordance with claim 15, wherein said support-structures include axially-outward-rings located in axially outward regions of said solenoid-magnet.

19. The method in accordance with claim 15, wherein said support-structures include a platen located in an axially-middle-region of said solenoid-magnet.

20. The method in accordance with claim 19, wherein said support-structures are radially-middle-rings located in a radially-middle region of said solenoid-magnet and located axially between said platen and said axially-outward-rings of said solenoid-magnet.

21. The method in accordance with claim 19, wherein said support-structures are radially-inward-rings located radially-inward of said solenoid-magnet and located axially between said platen and said axially-outward-rings of said solenoid-magnet.

22. The method in accordance with claim 15, wherein said support-structures are pie-wedges located in radially outward axially middle regions of said solenoid-magnet.

23. The method in accordance with claim 19, wherein said axially-outward-low-temperature-superconducting-coils are located axially between said platen and said axially-outward-rings and located radially in a radially-middle-region of said solenoid-magnet.

24. The method in accordance with claim 19, wherein said axially-inward-low-temperature-superconducting-coils are located axially between said platen and said radially-open-region and located radially in a radially-middle-region of said solenoid-magnet.

25. The method in accordance with claim 19, wherein said axially-outward-high-temperature-superconducting-coils
are located axially between said platen and said axially-outward-rings and are located radially between said radially-inward-rings and said radially-middle-rings of said solenoid-magnet.

26. The method in accordance with claim 19, wherein said axially-inward-high-temperature-superconducting-coils are located axially between said platen and said radially-open-region and located radially between said axially-open-region and said axially-inward-low-temperature-superconducting-coils of said solenoid-magnet.

27. The method in accordance with claim 15, wherein said axially-inward-high-temperature-superconducting-coils and said axially-outward-high-temperature-superconducting-coils are comprised of bismuth-strontium-calcium-copper-oxide.

28. The method in accordance with claim 15, wherein said axially-inward-superconducting-coils are comprised of rare-earth-metal, barium-copper-oxide (ReBCO) compounds, wherein said rare-earth-metal is yttrium, samarium, neodymium, or gadolinium or combinations thereof.

* * * * *